United States Patent Office 3,470,895
Patented Oct. 7, 1969

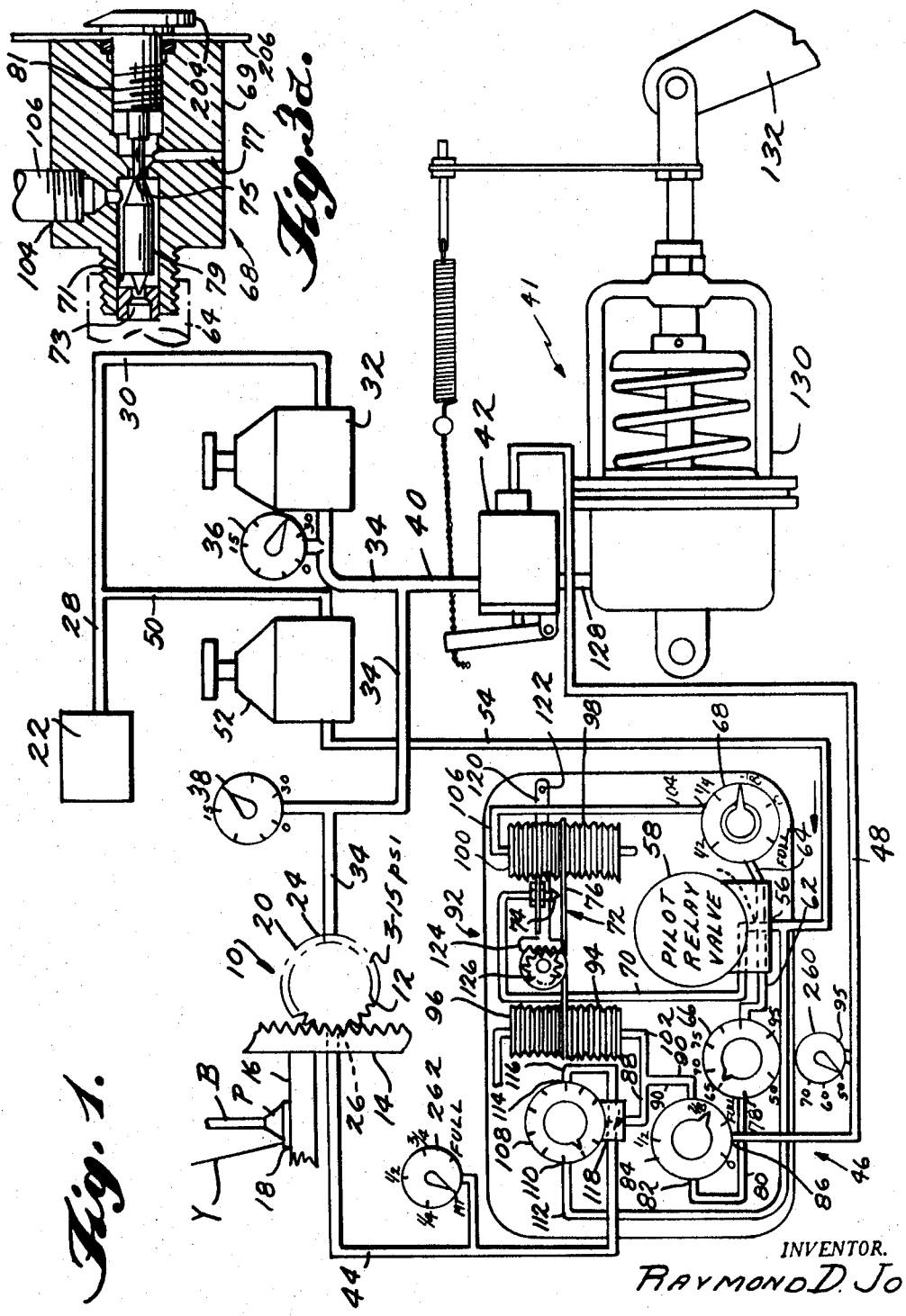

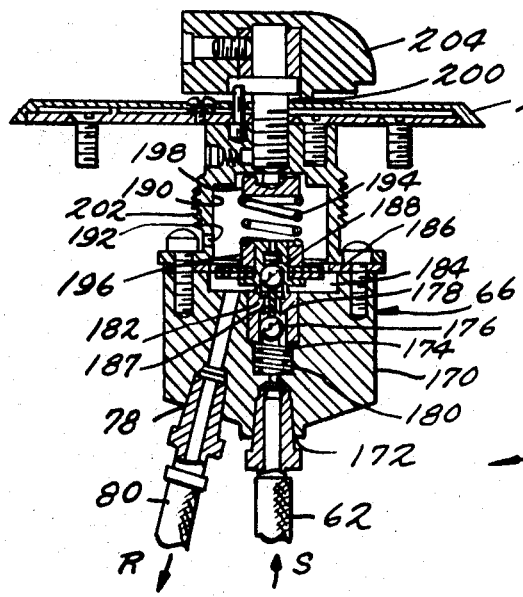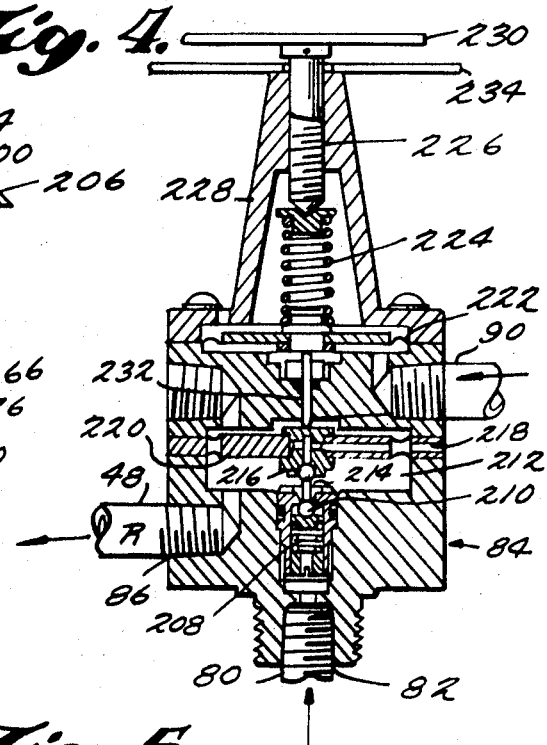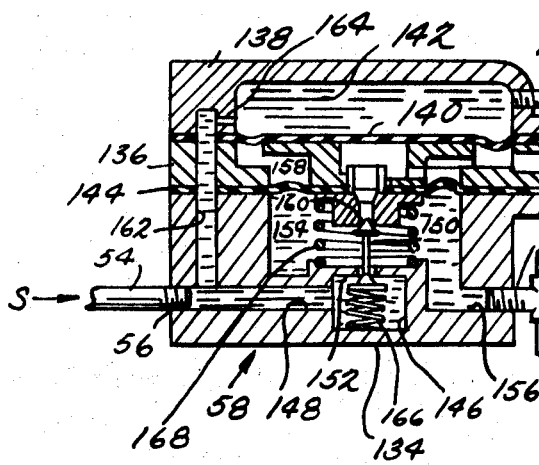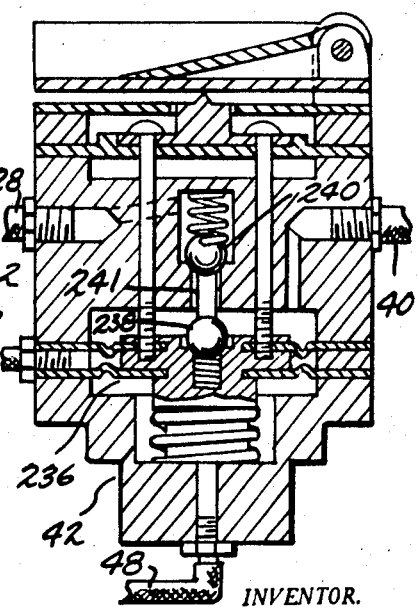
INVENTOR.
RAYMOND D. JOY

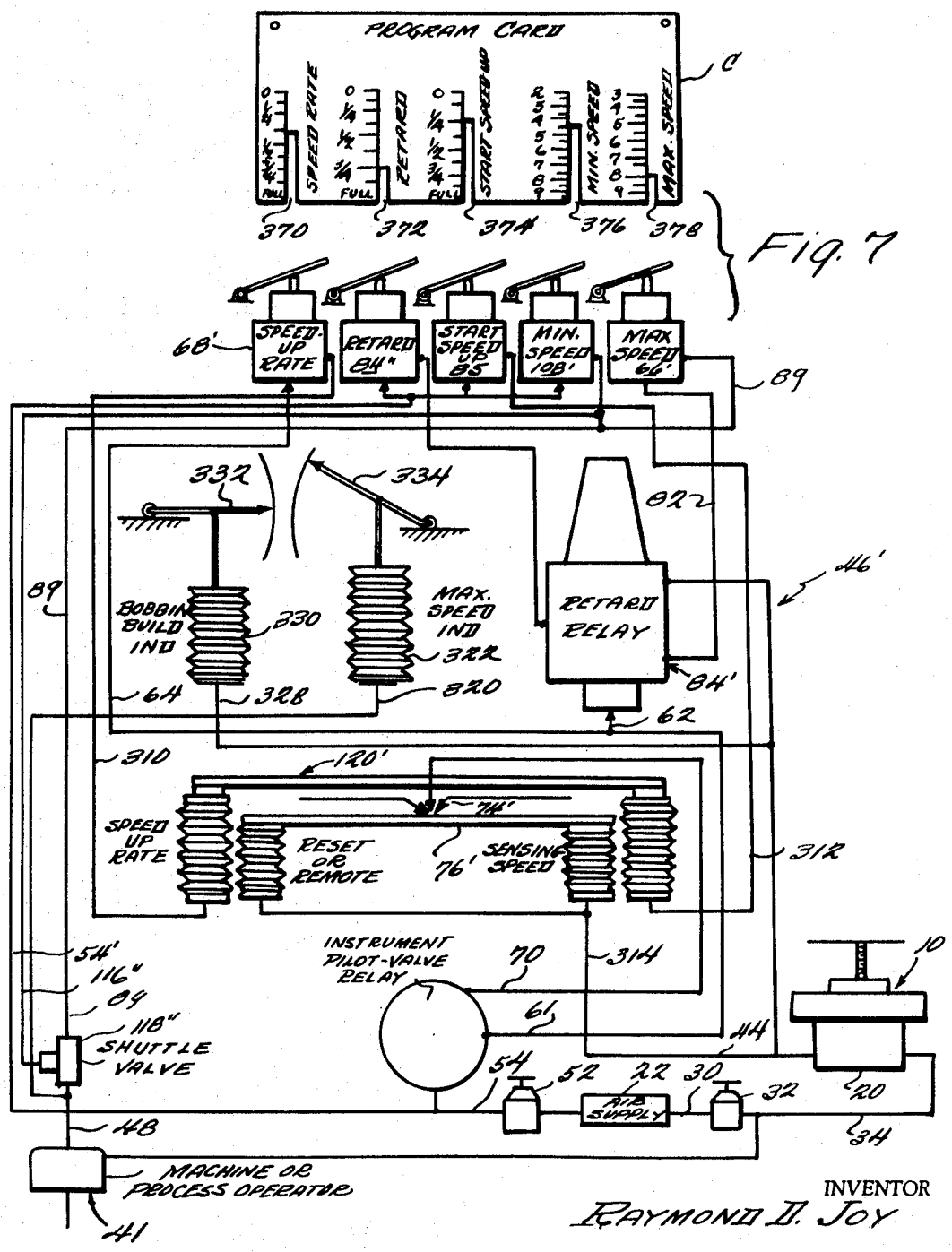

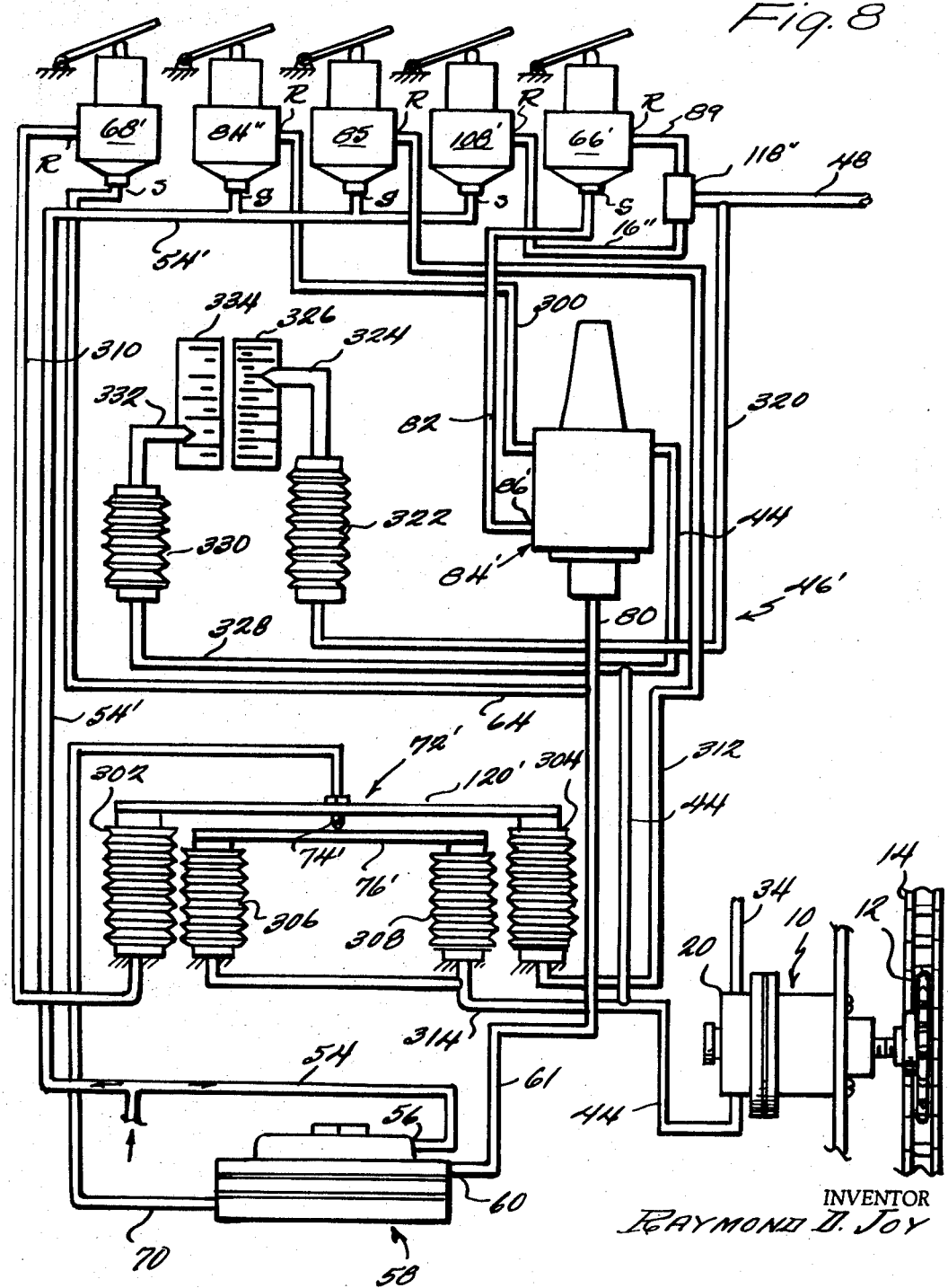

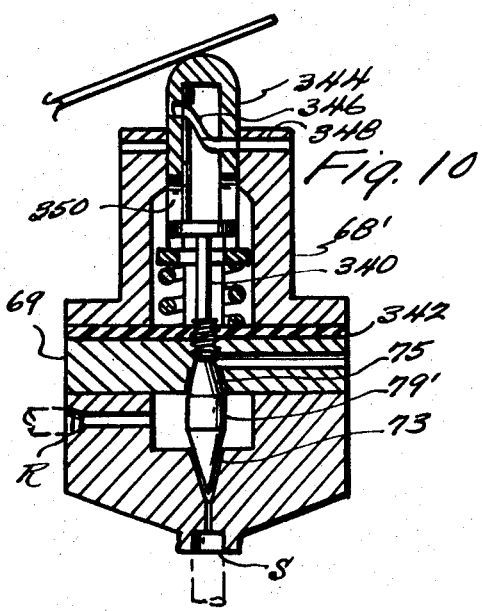
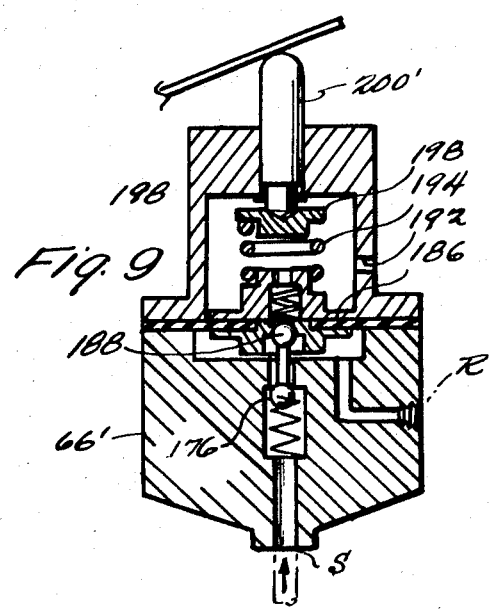
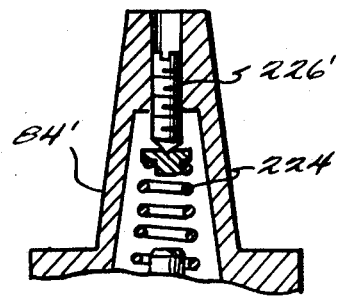
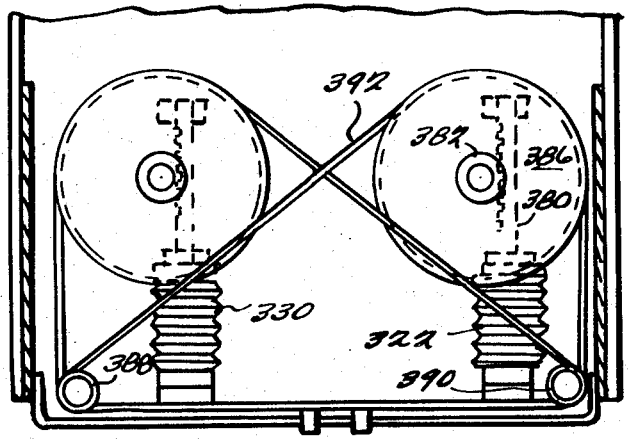

3,470,895
FLUID PRESSURE OPERATED PROGRAMMING AND CONTROL SYSTEM
Raymond D. Joy, Mecklenburg County, Va., assignor to Burlington Industries, Inc., Greensboro, N.C., a corporation of Delaware
Continuation-in-part of application Ser. No. 654,558, July 19, 1967. This application Jan. 12, 1968, Ser. No. 697,533
Int. Cl. F15b 5/00; D01h 13/14
U.S. Cl. 137—85         24 Claims

ABSTRACT OF THE DISCLOSURE

A fluid pressure operated system for programming a parameter of desired functions into an operation to effect the condition of the operation in accordance with the parameter programmed, the system including utilizing a transducer to sense the state of the operation at a particular time and to emit a pressure signal at a magnitude indicative of the state of the operation and a programming and controlling apparatus for setting up the functions of the parameter and issuing an output control pressure signal in accordance with such functions proportional to the pressure signal of the transducer as modified by the program functioned. The programming and control apparatus to set up and control the program may be either individually programmed for all functions controlling the parameter or it may be simultaneously programmed for all functions controlling the parameter and it includes means to control the magnitude of the parameter in relation to the progress of the operation enabling, for example, selection of the starting magnitude, the maximum magnitude, magnitude of the rate of increase to reach the maximum magnitude, magnitude of the decrease start point from maximum magnitude, the magnitude of the rate of decrease and the like.

---

This application is a continuation-in-part of my copending application Ser. No. 654,558 filed July 19, 1967.

The present invention relates to an improved fluid pressure operated system for programming desired functions into a parameter for an operation as the operation progresses, the functions effecting the operation so as to obtain predetermined results. More specifically, the present invention relates to an improved fluid pressure operated system in which a pressure signal indicative of the state of operation being performed is utilized proportionately to control further progress of the operation as modified by functions performed so that predetermined results are obtained.

While the present invention will be described in connection with the programming and controlling of an operation of a winding machine such as a spinning frame or the like wherein yarn is wound on a bobbin with the speed of the bobbin being varied within the build of the bobbin to provide optimum conditions for winding, it will be understood that the invention is capable of use in programming and controlling the parameter of any operation wherein desired predetermined optimum conditions are required. For example, the system of the present invention could be used to set up a parameter for controlling not only speed but also temperature, volume, pressure, liquid level, or the like conditions.

The present invention is an improvement over the system disclosed in the copending United States application Ser. No. 411,850, filed Mar. 17, 1964, of Raymond D. Joy, now Patent No. 3,332,224, wherein there is disclosed a pneumatic system for varying the speed of a spinning frame or the like to obtain certain optimum speeds during the course of build of the bobbin, the present system providing more flexibility in programming and controlling to obtain more optimum results.

An important object of the present invention is to provide an improved fluid pressure operated system for setting up a parameter having different functions and controlling an operation in accordance with the program set up, the system being such that the program can be repeated with uniform accuracy in subsequent operations.

Ancillary to the immediately preceding object, it is a further object of the present invention to provide a system in which the program may be set up manually and/or automatically, the control of the system being accurate with a minimum of lag between the sensing of the state of operation and the modifying of that state of operation in accordance with the programs set up.

Another object of the present invention is to provide a system for programming and controlling an operation by fluid pressure, the fluid pressure being preferably pneumatic so that the resulting system includes the reliability and ruggedness of pneumatic devices.

Still another object of the present invention is to provide a programming and controlling apparatus operable in response to an input signal indicative of the state of operation being performed, the apparatus producing an output signal varying proportionally as a function of the input signal within a prescribed parameter selected by an operator.

A further object of the present invention is to provide an improved system for programming and controlling an operation to effect a condition, the system utilizing known pneumatic elements uniquely arranged to provide for a program in which the magnitude of the parameter may be widely varied to produce a number of desired limits modified by one another.

A still further object of the present invention is to provide a pneumatic system for programming functions into a parameter, the system including means to control the magnitude of the parameter in relation to and as a function of the progress of the operation thus enabling selection of the starting magnitude, the maximum magnitude, magnitude of the rate of increase to reach the maximum magnitude, magnitude of the decrease start point from maximum magnitude and the magnitude of the rate of decrease or the like.

Briefly, the system of the present invention for programming the functions of a parameter effecting an operation being conducted includes a transducer means having a sensing means for sensing the state of the operation at a particular time and pressure responsive means connected to a source of pressure and operable by the sensing means for supplying a pressure signal at a magnitude indicative of the state of operation being performed and a programming and controlling apparatus operatively connected to the transducer means for receiving the pressure signal therefrom, the programming and controlling apparatus emitting or issuing an output pressure control signal at a magnitude normally proportional to the magnitude of the pressure signal from the transducer means but modified in accordance with the parameter of functions programmed therein. The programming and controlling apparatus, which is operatively connected to a suitable source of supply pressure, which may if desired be the same source of supply pressure as the source for the transducer means, is provided with a pilot operated relay valve means connected to the source of pressure for normally issuing a pressure signal of a magnitude proportional to the pressure signal from the transducer means, balance means for providing feedback pressure to the pilot valve means to control the same, the balance means being normally responsive to the input pressure signal from the transducer means and to a proportional band adjustment means for defining the magnitude of the rate of change of the parameter, set point means to selectively determine the state of operation at which an increase in the magnitude of the parameter will first be effected, a position switch means for determining the maximum magnitude of the parameter and a retard relay for selectively determining the stage of the operation at which the magnitude of the parameter will begin to reduce and the magnitude of the rate of reduction. A more detailed description of the invention and its operation will follow in the specification.

A further object of the present invention is to provide a system in which a plurality of functions controlling and modifying the state of an operation may be simultaneously programmed into the control apparatus.

Ancillary to the preceding object, it is a further object of the invention to provide an improved programming and controlling apparatus in which a card having cutout portions thereon is utilized to set up an entire program, thus making it simpler and easier to change programs with positive reproductions of programs available.

The aforementioned objects and advantages of the present invention as well as other objects and advantages will appear more fully in the following specification, claims and drawings in which:

FIGURE 1 is a diagrammatic view of the programming and control system of the present invention as applied, for example, to a winding machine or the like;

FIGURE 2 is a sectional view through a pilot relay valve means which may be used in the present system;

FIGURE 3 is a detailed sectional view of a pneumatic position switch means which may be utilized, for example, as set point means for determining the state of the operation at which an increase in magnitude of the parameter will be first effected, and/or a pneumatic position switch means for defining the maximum magnitude of the parameter;

FIGURE 3a is a detailed sectional view of a proportional band means for determining magnitude of rate of increase;

FIGURE 4 is a detailed sectional view of a multipurpose relay valve utilized as a retard means for defining the stage of the operation at which the magnitude of the parameter will begin to reduce;

FIGURE 5 is a detailed sectional view of a pneumatic relay for utilizing the output control pressure signal of the programming and controlling apparatus to effect a change in condition;

FIGURE 7 is a schematic view of a further modified system wherein the plurality of functions defining the parameter of operation may be automatically and simultaneously programmed;

FIGURE 8 is a diagrammatic view of the modified system disclosed in FIGURE 7;

FIGURE 9 is a detailed sectional view of a pneumatic position switch means similar to FIGURE 3 but modified for use with the system of FIGURES 7 and 8;

FIGURE 10 is a detailed sectional view of a unit similar to FIGURE 3a but modified for use with the system of FIGURES 7 and 8;

FIGURE 11 is a fragmentary sectional view of a multipurpose relay similar to the unit of FIGURE 4 but modified for use with the system of FIGURES 7 and 8;

FIGURE 14 is a top diagrammatic view of FIGURE 12 disclosing a typical connection for the indicators of speed and position.

Figure 6:
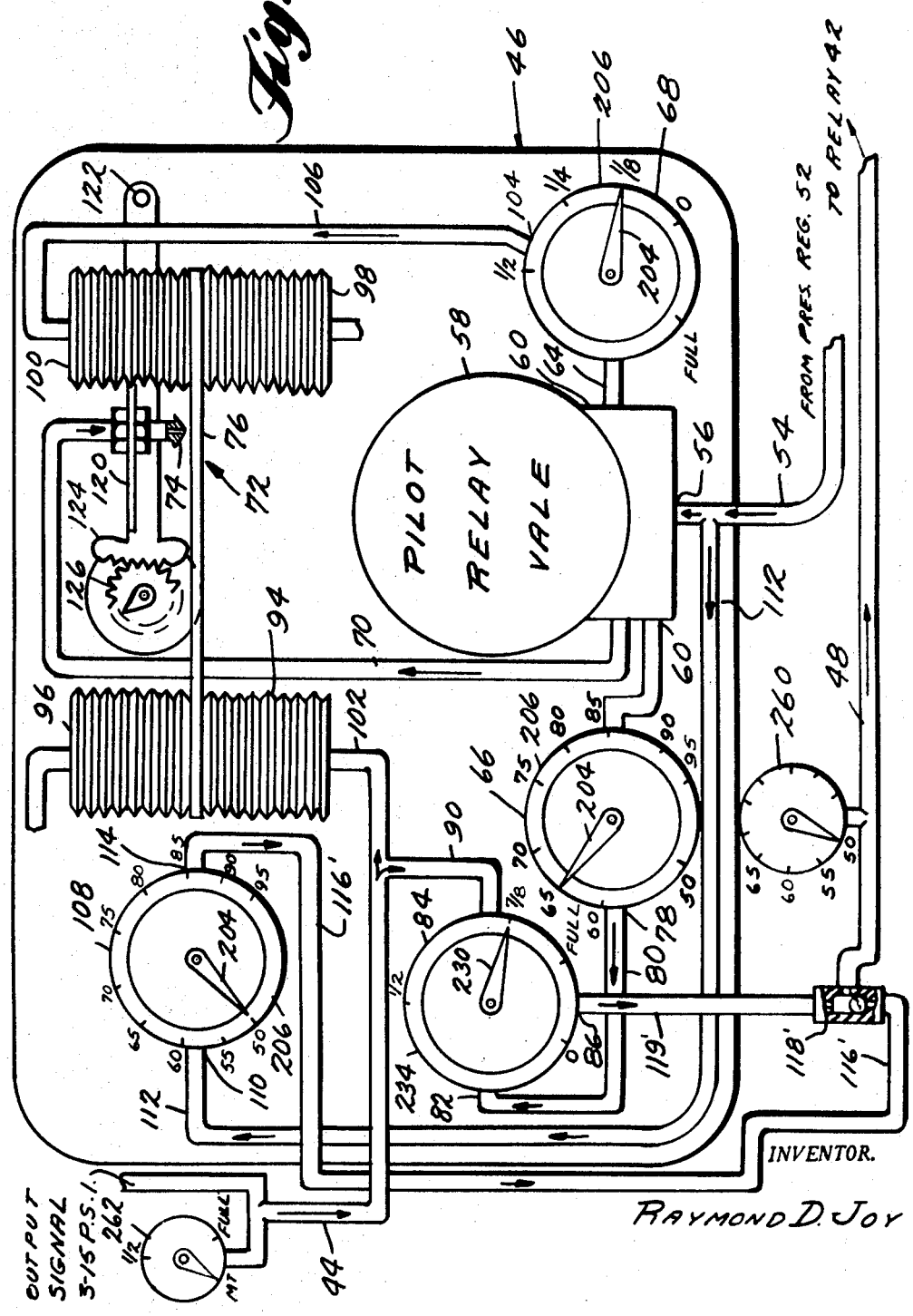
FIGURE 6 is a diagrammatic view similar to FIGURE 1 but disclosing a modified system of the present invention wherein the parameter for defining the magnitude of the start is not functional of the rate of change or proportional band.

Referring now to the drawings wherein like character or reference numerals represent like or similar parts, and in particular to FIGURE 1, the present invention is disclosed in association with a spinning frame generally of the type as shown in the aforementioned Joy application Ser. No. 411,850. The spinning frame may be of the usual type having head frame members with longitudinally extending frame members therebetween, a plurality of bobbin received spindles and a vertically reciprocating and traversing ring rail. As is customary of spinning frames of this type, the ring rail reciprocates in short strokes as yarn is being wound onto the bobbins, the ring rail being moved upwardly to a new position of traverse after a predetermined amount of yarn has been wound on the bobbin. The progressive periodic or step-by-step inwardly progressing movement of the ring rail and reciprocation of the same in short strokes in each position of traverse builds the package on the bobbin until the bobbin is doffed from its spindle after the ring rail has been moved to an empty bobbin position.

As disclosed in detail in the aforementioned Application Ser. No. 411,850, the type of yarn, the position of traverse of the ring rail, the amount of build on the bobbin, are all factors which determine the optimum speed of the bobbin at a particular position of traverse during the cycle of the filling operation. The speed of rotation of the bobbin is varied by varying the speed of the main drive shaft through a variable speed drive, the present invention being utilized to program and control operation of the variable speed drive.

The present invention utilizes a transducer unit generally indicated at 10 for sensing the state of operation being performed, the transducer unit including a sensing means 12 having a pinion movable by a rack 14 mounted directly on the end of a reciprocating ring rail 16. The ring rail 16 includes a plurality of the usual ring and traveler units 18 through which bobbins B extend and on which the yarn Y is wound as a package P. Transducer means 10 further includes a pressure responsive and regulating valve means 20 for continuously issuing a pressure signal indicative of the state of the condition sensed. The transducer means 10 including the sensing means 12, and pressure responsive and regulating valve means 20 is fully disclosed in the aforementioned application Ser. No. 411,850 and, therefore, a detailed disclosure of the same is not given herein as the subject matter concerning the transducer means is incorporated herein by reference thereto. Of course, it will be appreciated that the transducer means 10 disclosed herein is merely for the purpose of description of the invention and is not limiting the same to the specific type disclosed in application Ser. No. 411,850 as it will be fully appreciated that the transducer means could sense pressure, volume, speed, temperature or some other condition of an operation instead of speed and translate that state into a pressure signal defining the state.

It will suffice for the present description to know that a source of supply pressure 22, such as compressed air or the like, is utilized to supply air pressure to an inlet port 24 of the transducer means 10 at a predetermined constant value, a continuous pressure signal being issued from an outlet port 26 at a varying pressure based on the state of the operation sensed. In more detail, the source of supply pressure 22 feeds air under pressure through a manifold 28 and a branch conduit 30 to a pressure regulator 32 preferably set to issue an output pressure at 25 pounds per square inch. The air fed from the pressure regulator 32 is then fed through a conduit 34 to the pressure responsive and regulating valve means 20 of the transducer means 10. Preferably a pressure gauge 36 is placed immediately adjacent the outlet of the pressure regulator 32 to determine output pressure of regulator 32. A second pressure gauge 38 is positioned immediately adjacent the inlet port 24 of the tranducer unit 10. The gauge 38 will show any drop of line pressure and, since it is preferable to have at least 15 pounds pressure fed to the transducer unit, it is necessary to have the pressure regulator 32 set slightly higher as it must also feed a branch conduit 40 tapped into the conduit 34 for supplying pressure to a pneumatic machine or process operator generally designated at 41 which will be described later in the specification.

The transducer means 10 supplies its pressure control signal through a conduit 44 to the programming and controlling apparatus generally designated at 46 and this pressure is utilized by the apparatus 46 to indicate the state of operation at a particular point in the operation. The apparatus 46 in turn supplies an output control pressure signal normally proportional to the transducer control signal through the conduit 48 to the pneumatic relay 42 which is utilized to vary the condition of the operation, in this case the speed of rotation of the bobbins B. The description of the programming and controlling apparatus 46 will now follow, the elements of the same being first broadly described in their complete organization and then individually described.

Manifold 28 is provided with a second branch conduit 50 leading to an input port in a pressure regulator 52. The pressure regulator 52 may be of similar construction to the pressure regulator 32 and may include the usual filter means for filtering the air supply. It will be understood that the regulators 32 and 52 are utilized to reduce the pressure of air supplied from the source of pressure supply 22 to a suitable working pressure. Regulator 52 is adjusted to deliver air under pressure at 15 pounds per square inch to a conduit 54 which in turn leads to an inlet port 56 of the pilot relay valve means 58.

Pilot relay valve means 58 has an outlet port 60 (schematically shown in FIGURE 1) connected to conduits 62 and 64 for supplying a pressure signal to the position switch means 66 and the proportional band adjustment means 68 respectively. In addition to supplying a pressure signal from its outlet port 60, the pressure supplied to the pilot relay valve also passes into a pilot chamber within the valve means and from the pilot chamber to a conduit 70 leading to a flapper-valve assembly 72 having a nozzle 74 and a flapper element 76. The space between the nozzle 74 and the flapper 76 controls the feedback pressure in the conduit 70 to the pilot chamber of the pilot relay valve means 58 and this pressure controls internal valving which in turn controls the pressure signal issuing from the port 60.

The position switch means 66, which may be manually set and which is responsive to the signal from the pilot relay valve means 58, is utilized to control the maximum magnitude of the parameter, and in this case the maximum speed of the bobbin. Position switch means 66 issues a pressure signal from its outlet port 78, which is a function of the inlet pressure thereto, through a conduit 80 to an inlet port 82 of a retard relay means 84.

Retard relay means 84, which is also manually adjustable, defines the stage of the operation at which the magnitude of the parameter begins to reduce and, thus, in effect controls the magnitude of the rate of reduction subject to other functions. An outlet port 86 of retard relay means 84 issues a pressure signal through the conduit 48 which is the output pressure control signal utilized for varying the condition of the operation. The relay 84 is normally controlled as a function of the transducer pressure signal from the conduit 44 through the conduit 88 and branch conduit 90 and the function of the signal from the position switch means 66.

Pressure balancing means 92 are utilized for controlling the movement of the flapper 78 relative to the nozzle 74. In more detail, the balancing means or controller 92 includes a pair of bellows 94 and 96 on opposite sides of one end of the flapper element 76 and a second pair of bellows 98 and 100 on opposite sides of the other end of the flapper 76. The bellows 96 and 98 are both vented to atmosphere whereas the bellows 94 is operatively connected by a conduit 102 to the conduit 88 and the bellows 100 is operatively connected to the outlet port 104 of the proportional band means 68 by a conduit 106. An increase in pressure in the bellows 94 causes the flapper 76 to tend to move closer to the nozzle 74 and build up the feedback pressure in the conduit 70 to the pilot chamber of the pilot relay valve means 58 whereas an increase in pressure in the bellows 106 opposes this movement and tends to move the flapper 76 away from the nozzle so as to reduce the feedback pressure in the conduit 70.

Set point means 108, which is manually adjustable, has an inlet port 110 connected by a conduit 112 directly to the conduit 54 and thus the set point means receives a constant pressure in the order of 15 p.s.i. An outlet port 114 of the set point means 108 is connected by a conduit 116 to one inlet port of a shuttle valve 118, the other inlet port of the shuttle valve 118 being connected to the conduit 44. The outlet of the shuttle valve 118 is connected to the conduit 88.

The magnitude of the pressure signal from the set point means 108 determined by its manual adjustment defines the state of operation at which an increase in the magnitude of the parameter will be first effected and since this signal opposes the transducer pressure signal, the relative pressures of the two signals will determine the position of the shuttle valve 118 and thus which signal is directed to the conduit 88.

As shown in FIGURE 1, the nozzle 74 is mounted on an arm 120 pivoted at 122. The opposite end of the arm is provided with a rack 124 meshing with a manually rotatable pinion 126. Thus the initial position of the nozzle 74 relative to the flapper 76 may be adjusted at the start of operation of the system or during operation of the system to further define the condition of the parameter of operation at the start of and during the operation.

As mentioned above, the output pressure control signal is delivered through the conduit 48 to the operator 41 which includes, for example, a pneumatic relay 42 and an air motor 130. The relay 42, which is supplied air under pressure through the conduit 40, has an outlet conduit 128 connected to the air motor 130 which in turn is connected to an arm 132 for varying the condition of the operation and in this case the variable drive of the spinning frame. Details of the air motor 130 and its connection to the variable drive of the spinning frame are disclosed in the aforementioned application Ser. No. 411,850 and will not be repeated herein.

Referring now to FIGURE 2 of the drawings, the pilot relay valve means 58 is disclosed in detail and it comprises a lower casing 134, an intermediate casing 136 and an upper casing 138. A flexible diaphragm 140 is secured between the casings 136 and 138 and provides one wall of a pilot chamber 142. A second diaphragm 144 is secured between the casing 134 and 136.

Inlet port 56 and outlet port 60 are provided in the lower casing member 134, the inlet port communicating with a valve chamber 146 by means of a passage 148. The chamber 146 encompasses the lower portion of a valve member 150 and a seat 152 is provided in the chamber for the lower portion of the valve member. The upper portion of the valve member 150 extends into an upper chamber 154 beneath the diaphragm 144, the chamber 154 communicating with the outlet port 60 by a passage 156. A member 158 carried between the upper and lower diaphragms 140 and 144 respectively is provided with a valve seat 160 for coacting with the upper portion of the valve member 150. A passage through the member 158 to a space between diaphragms 140 and 144 and to atmosphere through the port 162 is normally sealed from the chamber 154 by means of the upper portion of the valve member 150 seating against the seat 160. The pilot chamber 142 communicates with the conduit 70 as well as with the passage 148. In more detail, a passage 162 extending from the passage 148 through the intermediate and upper casing members communicates with the interior of the pilot chamber 142 by restriction 164.

As will now be apparent, air under pressure, for example 15 pounds per square inch, is supplied by the conduit 54 to the port 56 and to the chamber 146. Normally a spring 166 is urging the valve member 150 upwardly relative to the chamber and towards its position where it closes against the seat 152. Likewise a spring 168 normally urges the member 158 upwardly so that the seat 160 is not engaged by the upper portion of the valve member 150. Pressure in the pilot chamber 142 reacts against the diaphragm 140 to move the member 158 downwardly to seat the upper portion of the valve against the seat 160 to prevent the escape of air to atmosphere from chamber 154. Additionally, this downward movement of the member 158 once it seats on the valve member 150 will cause the valve member 150 to move downwardly against the spring 166 to unseat the lower portion of the valve member from seat 152 to permit fluid under pressure to pass into the chamber 154 and out of the port 60 to the respective conduits 62 and 64.

It has been heretofore mentioned that an increase of pressure in the bellows 94 will reduce the space between the nozzle 74 and the flapper 76. This causes a restriction in the escape of fluid through the nozzle 74 and thus builds up a feedback pressure into the pilot chamber 142 and will move the diaphragm 140 and member 158 downwardly. Conversely, when the pressure signal flowing from the pilot valve means 58 to the conduit 64 through the proportional band means 68 to the bellows 100 is greater than the pressure in the bellows 94, the flapper 76 will move away from the nozzle relieving the pressure buildup in the pilot chamber 142 to permit the lower portion of the valve 150 to close and the upper portion to open so that the chamber 154 can bleed to atmosphere.

Referring now to FIGURE 3, there is disclosed the position switch means 66 for defining the maximum magnitude of the parameter of the operation. The position switch means 66 may be an identical unit to the set point means 108 and thus a description of the structure for one will suffice for the others. However, the proportional band means 68 is preferably a metering valve such as shown in FIGURE 3a and a brief description of the same will follow later. While the position switch means 66 and the proportional band means 68 function with a varying inlet pressure, it will be noted that the set point means 108 functions with a constant inlet pressure and limits the outlet pressure to a selected constant pressure reduced from its inlet pressure by manual adjustment of the same.

The position switch means 66 includes a body 170 having an inlet port 172 communicating with a valve chamber 174 in which is mounted a ball valve 176. The ball valve 176 is normally urged against a seat 178 by a spring 180. A passage 182 leading to a second chamber 184 beneath the diaphragm 186 carries a push pin 187 for engaging a second ball valve 188 spring urged in the opposite direction to the ball valve 176. The ball valve 188 is an exhaust valve which when unseated permits fluid under pressure to escape into a chamber 190 and from there to atmosphere through a port 192. An adjustment spring 194 between an exhaust valve body 196 carried by the diaphragm 186 and an adjustable member 198 normally urges the diaphragm 186 and the exhaust valve body 196 against the pressure in the chamber 184 and when the force of the spring is greater than the pressure in chamber 184, the exhaust valve 188 will be closed and the supply valve 176 will be open. Member 198 is carried on the end of an adjusting screw 200 threadedly carried in the spring housing 202, the adjusting screw 200 being provided with an adjusting knob 204. An indicator dial 206 for the position switch means 66 is provided, the indicator being calibrated in the environment disclosed to indicate magnitude of maximum r.p.m. of the bobbin spindle for a parameter.

Referring now to FIGURE 3a, the proportional band means 68 is a metering valve having a body 69 with a through bore having a chamber 71 therein, the chamber being provided with a first restriction 73 adjacent its inlet port and a second restriction 75 communicating with a vent passage 77 to atmosphere. A member 79 carried on the end of a shaft 81 threadedly received in the body 69 has its ends respectively cooperating with the restrictions 73 and 75 to control the metering of the pressure signal from the outlet port 104 to the conduit 106.

The proportional band means 68 further has an indicator dial 206 carried on its body and a knob 204 connected to the shaft 81 for adjusting the position of the member 79 relative to the orifices or restrictions 73 and 75. While the indicator dial 206 for the position switch means 66 and the set point means 108 are both calibrated to represent r.p.m. for the control of their particular magnitudes of the parameter, the indicator dial 206 for the proportional band means is calibrated to signify the percent of a complete cycle for the magnitude of the proportional band. In other words, the cycle represents the build on the bobbin B and movement of the control knob 204 of the proportional band means 68 to any percentage of the cycle will indicate the point on the cycle where the speed of the bobbin reaches maximum r.p.m. and, thus, the proportional band means is in effect controlling the speedup rate from start speed to maximum speed.

Referring now to FIGURE 4, the retard relay means 84 is disclosed. The retard relay means 84 is merely a pneumatic multi-purpose relay having its inlet port 82 leading to a valve chamber 208 provided with a ball valve 210 spring urged to close the chamber 208 from a diaphragm chamber 212. The diaphragm chamber 212 is connected to the outlet port 86 which delivers the output control pressure signal of the system to the utilization means or pneumatic relay 42. The ball valve 210 urges a push pin 214 upwardly so as to cause a second ball valve 216 to seat and close a bleed 218 to atmosphere. Diaphragm 222 is responsive to pressure from the conduit 90 and opposes the adjustment spring 224. The adjustment spring 224 is controlled by a screw 226 threadedly received in a diaphragm housing 228, the screw 226 having a control handle 230 thereon. Rotation of the handle in one direction or the other increases or decreases pressure of the spring on the diaphragm 220, this being translated to the lower diaphragm 220 by means of a push pin 232. The relay means 84 is provided with an indicator dial 234 which is calibrated in percent of a full cycle of operation, in this respect the amount of build on the bobbin wherein action is effected. As previously explained, the retard relay means will determine the point or magnitude of build on the bobbin where the maximum magnitude of the parameter begins to reduce and thus it represents the magnitude of the rate of reduction.

FIGURE 5 of the drawings discloses the pneumatic relay means 42 through which the output control signal is reflected into changing the condition of the air motor 130. In this respect, the pneumatic relay 42 is substantially similar to the pneumatic relay disclosed in the aforementioned application Ser. No. 411,850 and a detailed description of the same is not believed necessary. However, it will be noted that the output control pressure signal from the programming and controlling apparatus 46 acts against the diaphragm 236 to control the position of the ball valves 238 and 240 separated by the push pin 241 and thus control the ultimate signal delivered through conduit 128 from conduit 40.

The setting up of a program and the control of the system of FIGURE 1 will now be described. For the purpose of this description, assume that a program of the following sequence is desired:

(1) Start the operation at an initial speed of 5,000 r.p.m. for the bobbin.

(2) Increase the r.p.m. speed of the bobbin to a maximum of 6,500 r.p.m.

(3) Reach the maximum speed of the bobbin at a magnitude of one-eighth of the cycle of the complete operation.

(4) Hold the maximum speed of the bobbin to a magnitude of seven-eighths of the cycle.

(5) Retard or reduce the speed of the bobbin from seven-eighths to the full cycle.

The cycle of the operation is programmed into the apparatus 46 by first manually setting the knob of the proportional band means 68, which controls the speed-up rate, to one-eighth of the full cycle. Then the start speed or set point means 108 is manually set with its knob pointing at 5,000 r.p.m. Thirdly, the knob of the position switch means 66 for control of maximum speed is set to 6,500 r.p.m. and then the retard relay means 84 has its knob set so that it functions at seven-eighths of the complete cycle. The calibrating knob or pinion 126 is then adjusted until a speed indicator gauge 260 provided in the conduit 48 reads 5,000 r.p.m. and thus the initial distance between the flapper 76 and nozzle 74 is adjusted. The system is then started and yarn is fed to the traveler and built onto the bobbin B.

As the yarn is being built on the bobbin B, the transducer means 10 will be emitting a continuous pressure signal indicative of the particular state of the operation. The pressure responsive regulating valve means 20 of the transducer will deliver a pressure signal between 3 and 15 pounds per square inch dependent on the state of the operation and this is indicated on a pressure gauge 262 in line 44, the gauge being calibrated in percent of the cycle. The output pressure signal of the transducer means is linear in proportion to the magnitude of the cycle of the product being produced and this signal is transferred through the conduit 44 to the shuttle valve 118. If the transducer pressure signal is greater than the pressure signal of the set point means 108, the shuttle valve will close off the conduit 116 and the transducer pressure signal functions to control the start speed. Conversely, and in the present example, it is assumed that the pressure signal from the set point means 108 is greater than the transducer pressure signal and thus it will cause the shuttle valve to close off the signal from the transducer means 10, the signal from the set point means being constant and controlling the start speed. When the transducer pressure signal overcomes the pressure signal from the set point means 108, the transducer signal then flows through to the retard relay 84 and to the bellows 94. Since the retard relay means 84 is set at seven-eighths of a full cycle, the pressure of its spring 224 is not overcome by the transducer pressure signal until the state of the operation has reached a point where the transducer pressure signal has increased sufficiently to cause closing of the internal valving in the retard relay means.

As pressure inside the bellows 94 builds up with the increase of the transducer pressure signal, the spacing between the flapper and the nozzle decreases causing a feedback pressure to the pilot chamber 142 of the pilot relay valve means 58 thus opening its internal valving to permit a change in the pressure signal through the conduits 62 and 64 into the respective position switch means 66 and proportional band means 68. The position switch means 66 will have its internal valving remaining open until the pressure of the signal in 62 reaches a point which will close the same.

When pressure is sufficient to cause the internal valving of the pilot relay valve means 58 to open, a pressure signal issues to the position switch means 66 as well as to the proportional band means 68. The pressure signal flowing from the pilot relay means to the proportional band means 68 in turn meters a pressure signal to the bellows 100. As the pressure builds up in the bellows 100 and opposes the pressure in the bellows 94, the flapper 76 moves away from the nozzle 74 relieving the pressure in the pilot chamber 142, thus, closing down the internal valving of the pilot relay to hold the system at a new speed. This is continued until the maximum speed of 6,500 r.p.m. is attained and this is obtained when the transducer pressure signal has risen from 3 to 4½ pounds per square inch or at one-eighth of the cycle. The position switch means 66 will start functioning at this point to hold the maximum speed at 6,500 r.p.m. by its internal valving which at this time bleeds all higher pressures to atmosphere so as to provide a balance to control the system.

As soon as the build on the bobbin has reached seven-eighths of its full cycle, the retard relay 84 begins to function to decrease the output control signal to the pneumatic relay 42. The transducer signal at this point is in the range of 14½ pounds per square inch and as it increases to 15 pounds per square inch, it overcomes the adjustment spring in the retard relay causing the internal valving to close the inlet port 82 and open the exhaust port 162 hence gradually reducing the speed from 6,500 r.p.m. to 5,000 r.p.m. This reduction of speed begins to occur at seven-eighths of full cycle and continues until full cycle.

It will now be obvious that numerous other sequences of action can be controlled and programmed into the system by adjustment of the controls of the various components in a desired manner. For example, the speed can be increased at a predetermined rate to a maximum and maintained at the maximum rate for the remainder of a complete cycle or it can be reduced from the maximum at any point from the time it reaches the maximum r.p.m. until the completion of the cycle. Also, the program can be arranged to start at a maximum speed, continue at that maximum speed for a predetermined percent of the cycle of operation and then reduce to a minimum speed at full cycle. For that matter, the program can be set up to increase and decrease the speed at any magnitude of the cycle.

Referring now to FIGURE 6 of the drawings, there is disclosed a slight modification of the system of FIGURE 1. Since the elements of the system of FIGURE 6 are identical to those of FIGURE 1, the same numerals to the elements will be applied. The only differences will be indicated by numerals having a prime attached thereto.

In the system of FIGURE 6 the transducer pressure signal transmitted through the line 44 is still applied to the retard relay means 84 and to the bellows 94. However, instead of feeding the pressure signal from the set point means 108 to the shuttle valve 118 where it directly opposes the signal from the transducer means, the outlet port 114 is connected by a conduit 116′, the conduit 116′ being connected to one inlet port of a shuttle valve 118′, the other inlet port of the shuttle valve 118′ being connected to a conduit 119′ extending from the outlet port 86 of the retard relay 84. The outlet of the shuttle valve 118′ is then connected to the conduit 48 for delivering the output pressure control signal to the pneumatic relay means 42.

By the arrangement disclosed in FIGURE 6, the magnitude of the starting speed can be shifted by the manual adjustment of the set point means 108 independently of the other components of the apparatus 46. This is a particularly desired feature in that the proportional band means 68 does not affect the start-up speed setting as in the system of FIGURE 1 and thus the start speed setting is linear and repeatable with every dial setting.

Referring now to FIGURES 7 through 14 inclusive, there is disclosed a modification of the system previously described relative to FIGURES 1 through 6. Since the system of FIGURES 7 through 14 is basically similar to the system previously described, the same reference numerals will be utilized for identical parts with either new reference numerals or reference numerals with primes being utilized for those parts that have been modified. The system disclosed in FIGURES 7 through 14 inclusive provides for a multi-function programming and controlling apparatus in which all of the functions of the parameter may be instantly and simultaneously programmed into the system. Additionally, the system discloses a modified unit for receiving the programmed signal and translating this signal into a change of operation of the process or machine being controlled.

With reference to FIGURES 7 and 8, a schematic view and a diagrammatic view respectively of the entire system is disclosed. The transducer unit 10 is again disclosed as sensing the state of operation being performed; in this case the sensing of a position of traverse of a reciprocating ring rail of a spinning frame. The transducer unit 10 includes the sensing means 12 cooperating with the rack 14 mounted on the end of the reciprocating rail. The pressure responsive and regulating valve means 20 of the transducer unit 10 receives through the conduits 30 and 34 a supply of air pressure from the source 22, the pressure being reduced by the regulator 32 to a desired constant working pressure.

The variable pressure control signal from the transducer unit 10 is supplied through the conduit 44 to the programming and controlling apparatus generally designated at 46' and this pressure is utilized to indicate the state of the operation at a particular point in the operation. The apparatus 46' in turn supplies an output control pressure signal, normally proportional to the transducer control signal, through the conduit 48 to a machine or process operator generally designated at 41, the operator 41 being utilized to vary the condition of the operation as determined by the program set up in the programming and control apparatus 46'.

The programming and controlling apparatus 46' is supplied with air under pressure from the source of supply 22 through the regulator 52 which in turn delivers air, for example, at 15 pounds per square inch, to the conduit 54 leading to the inlet port 56 of the pilot relay valve means 58. Since the pilot relay valve means 58 for the system of FIGURES 8 through 16 inclusive is identical with the pilot relay valve means 58 previously described, no further detailed description of the internal construction of the same is necessary. It will suffice to state that the pilot relay valve means 58 supplies a pressure signal from its outlet port 60 through the conduit 61 to the conduits 80 and 64 respectively for supplying pressure signals to the retard relay means 84' and to the pressure control module or proportional band adjustment means 68'. In addition to supplying a pressure signal from its outlet port 60, the pressure supplied to the pilot relay valve also passes into its pilot chamber and from the pilot chamber to the conduit 70 leading to the flapper-valve assembly 72' having a nozzle 74' and a flapper element 76'.

The air, which is supplied to the pilot relay valve means 58 through the conduit 54 at a predetermined pressure, is also supplied through a branch conduit 54' to the supply ports S of the pressure control modules 84", 85 and 108'. The pressure control module 84", in conjunction with the retard relay 84', controls the point of the state of the operation at which the magnitude of the parameter reduces from the maximum magnitude whereas the pressure control module 85 controls the point of the state of the operation at which the magnitude of the parameter begins or starts to increase from its minimum magnitude. The module 108' controls the minimum magnitude of the parameter at any state of the operation as determined by the modification of functions controlled by the other modules.

A fifth pressure control module 66' has its supply port S connected to the return port 86' of the balance retard relay 84' and thus it receives a varying pressure signal which determines the pressure signal issuing therefrom through the conduit 89 to one inlet port of a shuttle valve 118", the shuttle valve 118" being connected to the conduit 48 which supplies a signal to the machine or process operator 41.

The pressure control modules 84", 85 and 108' receive air at a constant inlet pressure at their supply ports S and they each issue a signal at a predetermined pressure, dependent upon their adjustment, from their return ports R to control a particular function of the parameter of the operation. While the signals issuing from the modules 84", 85 and 108' do not fluctuate or vary during the state of the operation, these signals are transferred to other units of the system for modifying the parameter of the operation in accordance therewith.

In more detail, the pressure control module 108' has its return port R connected by the conduit 16" to the other inlet port of the shuttle valve 118" so that it is operating directly against the varying signal issuing from the port R of the maximum magnitude module 66'. Thus, when the pressure of the signal issuing from module 108' is greater than the pressure of the signal issuing from the module 66' it will effectively control the minimum magnitude of the parameter and the magnitude will not increase until such time the signal from the module 66' becomes greater. Thus, it will be seen that module 108 controls the minimum magnitude of the parameter and in this particular case the minimum speed of the spinning frame.

Module 84" has its return port R connected to the port of the retard relay 84' which was normally open to atmosphere as shown in FIGURE 4. By connecting the return port R of module 84" to the retard relay 84' through the conduit 300, a predetermined load can be placed on the upper side of the diaphragm 220 so that the two units, namely, the module 84" and the retard relay 84', are effectively operating in a manner similar to the retard relay means 84 of FIGURES 1 through 6 inclusive. However, a greater range of control is provided because, in addition to the variable control provided by the module 84", the retard relay 84', as shown in the fragmentary view of FIGURE 11, is modified from the disclosure in FIGURE 4 to replace the control handle 230 and control screw 226 with a set screw 226' for a preset adjustment of the spring 224. By lowering the pressure on the spring 224, a balance for retard depending on the setting of the module 84" can be made earlier. Conversely, by increasing the pressure on the spring, retard for the system will be later for a particular setting of the module 84".

Referring now to the flapper-valve assembly 72', it will be noted that the nozzle 74' is mounted on the center of an arm 120', the arm having its respective ends attached to the movable ends of bellows 302 and 304 respectively. The flapper element 76' has its ends respectively mounted on the movable ends of bellows 306 and 308. Thus, it will be evident that by movement of either set of bellows, the relative position between the nozzle 74' and the flapper element 76' is changed, thus changing the back pressure in the pilot chamber of the pilot relay 58.

Bellows 302 is supplied through the conduit 310 with a pressure signal issuing from the return port R of the module 68' whereas bellows 304 is supplied through a conduit 312 with a pressure signal issuing from the return port R of the module 85. Since the module 85 issues a constant pressure signal depending upon its initial adjustment, it in effect determines the pivot point of the arm 120' throughout the state of the operation. On the other hand, module 68' is supplied through its supply port S with a pressure signal from the conduit 64 which varies according to the modification of the pressure signal issuing from the pilot relay valve means 58.

Both of the bellows 306 and 308 are connected by a conduit 314 to the conduit 44 extending from the transducer unit 10. Consequently, the control signal issuing from the transducer unit 10 to indicate the state of the operation and, in this case the point of traverse of the ring rail, will effectively control the position of the flapper element 76' during the entire operation.

It will now be seen that the pressure control module 85 functions similar to the rack and pinion 124 and 126 of the systems of FIGURES 1 to 6 to define the condition of the parameter of operation at the start of the operation whereas the module 68' controls the proportional band and thus the rate of increase of the magnitude from the start of the operation until maximum magnitude of the parameter is reached. On the other hand, the change in the pressure signal issuing from the transducer unit 10 will be changing the position of the flapper element 76' with respect to the nozzle 74' to thus modify the pressure in the pilot relay 58 so as to make the magnitude of the output pressure control signal from the programming and control apparatus normally proportional to the pressure signal indicative of the state of the operation.

The programming and controlling apparatus 46' is provided with means for indicating the cycle point of the state of the operation and the magnitude of the parameter throughout the entire cycle of the operation. In more detail, a branch conduit 320 is connected to the conduit 48 which issues the output control signal of the apparatus. The branch conduit 320 has its other end connected to a bellows 322 and the bellows 322 is operatively connected to an indicating pointer 324. The indicating pointer cooperates with a scale 326 which is suitably marked to indicate, in this particular instance r.p.m. of the bobbin, at any particular time during the cycle of the operation.

Conduit 44, which extends from the transducer unit 10 to the retard relay 84' for supplying the signal from the transducer unit to the same, is provided with a branch conduit 328 leading to a bellows 330. The bellows 330 thus is expanded or contracted depending upon the change of pressure signal from the transducer unit 10. Bellows 330 is operatively connected to an indicator pointer 332 which cooperates with a scale for indicating percent of the cycle of operation. Thus, since the pressure signal from the transducer unit 10 is indicative of the state of operation at a particular point during the cycle of operation, the indicator 332 will read the point on the cycle for the particular operation. In the present case, since the operation is described with respect to the winding on a bobbin, the indicator 334 will indicate the percentage of fill on the bobbin or, in other words, the point of traverse of the bobbin during winding.

Referring now to FIGURE 9 there is disclosed the pressure control module or position switch means 66' for defining the maximum parameter of the operation. The module or position switch means 66' is identical in construction to the modules 84', 85 and 108' and, therefore, the description with respect to the same will suffice for the others. Additionally, the module 66' is substantially identical in operation to the position switch means or module 66 shown in FIGURE 3 and elements which are identical will not be further described except where necessary. Since the programming and controlling apparatus 46' is intended to be capable of having an entire program set up instantly, the means for controlling the loading of the diaphragm 186 by spring 194 had to be changed. In this respect, the adjusting screw 200 of FIGURE 3 is replaced by a plunger 200', the plunger being capable of reciprocating movement against the follower or member 198. It will now be obvious that the position at which the plunger is set will determine the load spring 194 applies to the diaphragm 186.

The proportional band means 68' shown in FIGURE 10 is substantially identical to the proportional band means 68 shown in FIGURE 3a with respect to the metering valve having the adjustable restrictions 73 and 75. However, the member 79' is not directly connected to the means which moves the same relative to the restriction. The member 79' is provided with a valve stem 340 which is T-shaped at its upper end. A portion of the valve stem is threaded as indicated at 342, the threads cooperating with threads provided in the body 69. A plunger 344, which is hollow and provided with helical grooves 346, receives a pin 348 therethrough carried in the body 69. The lower end of the plunger is provided with axially extending keyways 350 that receive the T-shaped head of the valve stem 340. Thus, when the plunger is moved in or out by an axial force on the same, it rotates on its axis thus causing the T-shaped head to rotate the valve stem 340 to move the member 79' one way or the other to change the restrictions 73 and 75.

Figure 12:
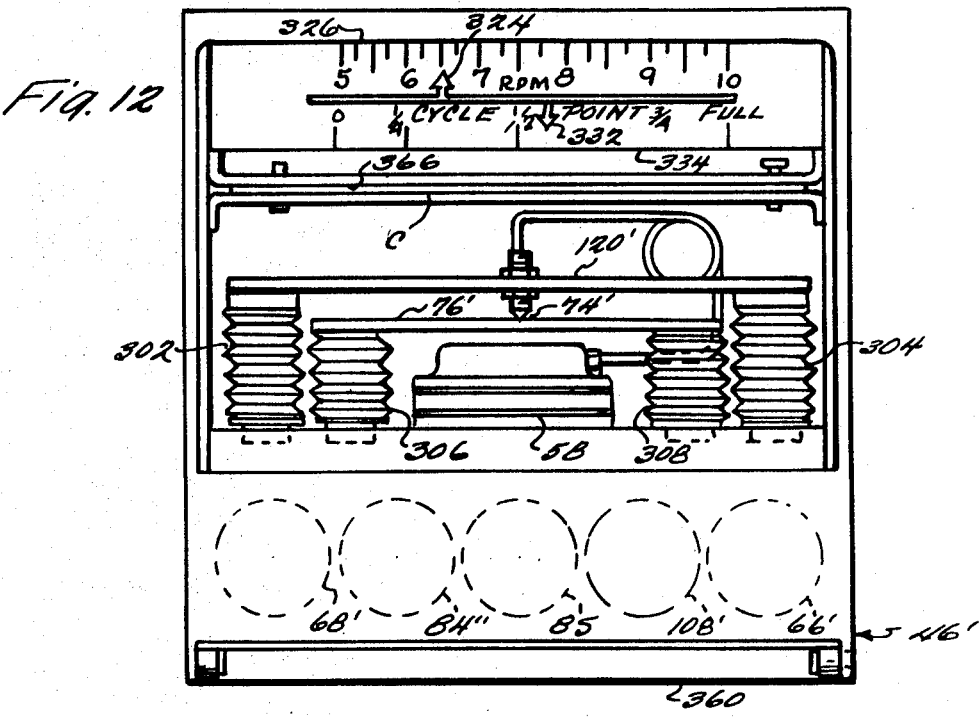
FIGURE 12 is a front elevational view of the programming and controlling apparatus of the system of FIGURES 7 and 8.
Figure 13:
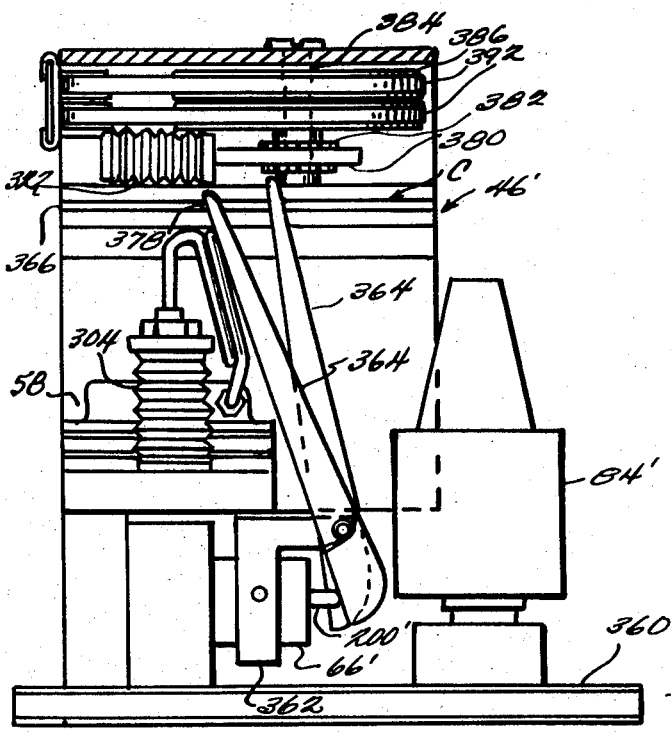
FIGURE 13 is a side elevational view, partly in section of the apparatus of FIGURE 12.

Referring now to FIGURES 7, 12, and 13 of the drawings it will be noted that the programming and controlling apparatus 46' is provided with a frame structure or housing 360 and that the modules 68', 84", 85, 108' and 66' are mounted in close side by side relationship with their plungers extending all in the same direction. Each module is provided with an L-shaped bracket 362 which pivotally carries a lever arm 364, there being one lever arm for each module. One end of each lever arm engages the respective plunger of the module whereas the other end of the lever arm extends upwardly through the housing 360 to a position adjacent a slot 366 in one wall of the housing. The lever arms 364 are each spring urged in a direction so that their upper ends move toward the slot and their lower ends permit the plungers of the respective modules to extend their full amount.

The slot 366 is provided with guide means for receiving a precut card C (FIGURE 7), the card having five cutout portions 370, 372, 374, 376 and 378. Each cutout portion is for controlling a particular function of the parameter of the program and thus, when the card C is inserted into the slot 366, its cutout portions will engage the respective levers 364 and pivot them a predetermined distance to thereby move the plungers of the respective modules a predetermined distance. This effectively sets up simultaneously the program for each function of the parameter and thus does not require the individual arjustment as with the system shown in FIGURES 1 to 6 inclusive.

Referring now to FIGURE 14 there is disclosed a diagrammatic hookup for the indicators for speed and point on the cycle of operation. In more detail, it will be noted that the bellows 332 and 330 are mounted in side by side relationship in the upper part of the housing 360. Each bellows is provided with a rack 380 cooperating with a pinion 382. Pinion 382 is mounted on a vertical shaft 384 having a large wheel 386 thereon. The wheel 386 for one bellows is at a different elevation than the wheel 386 for the other bellows as endless belts or tapes 392 pass around the respective wheels 386 and idler wheels 388 and 390. When the bellows 322 or 330 moves, it will cause its respective wheel 386 to rotate and this will in turn rotate the respective endless belt 392 extending about the same and about the idlers 388 and 390. The endless belt 392 is provided with the indicator pointers 324 or 332 thereon as the case may be.

The setting up of a program and the control of the same with respect to the system described in FIGURES 7 and 8 will now be described. For the purpose of this description, assume that a program of the following sequence is desired:

(1) Start the operation at an initial bobbin speed, which in this case is a minimum speed of 4,500 r.p.m. for the bobbin.

(2) Increase the r.p.m. speed of the bobbin to a maximum of 8,000 r.p.m.

(3) Start the increase of speed from the minimum speed toward the maximum speed at a magnitude of one-fourth of the cycle of the complete operation.

(4) Reach the maximum speed of the bobbin at a magnitude of three-eighths of the complete cycle.

(5) Retard or reduce the maximum speed of the bobbin from a magnitude of three-fourths to the full cycle.

In order to set up the above program, a card C is selected which is provided with cutouts 370 to 378 therein cut out to the proper length for the respective function which the cut outs control. The card C is then positioned in the housing 360 of the programming and controlling apparatus 46' and it simultaneously adjusts each of the levers 364 which control the plungers for the respective modules 68', 84", 85, 108' and 66'. When this has been accomplished, the system is ready to start so that the output control signal delivered from the programming and controlling apparatus 46' through the conduit 48 will reflect the magnitude of the parameter desired and properly position the operator arm of the machine or process operator 41, the operator 41 in turn controlling the speed of the bobbin at a particular instant. At the start of the operation, the minimum speed module 108' will be supplying a pressure signal from its return port R through the conduit 116" to the shuttle valve 118" causing the shuttle valve to move to a position to block off the inlet connected to the conduit 89. At this time, the maximum speed module 66' is so set as a function of the signal of the transducer unit 10 that the pressure signal being discharged from its port R is less than the pressure signal being discharged from the minimum speed or magnitude module 108'. This condition will remain static until such time that the speed-up start point module functions in conjunction with the change of the transducer pressure signal which in turn causes changing of the relative position of the nozzle and flapper to cause the pilot valve relay to permit the pressure discharged from the port 86' of module 66' to increase so that the pressure being discharged from the maximum speed module increases over that discharged from the minimum speed module 108'.

As mentioned above, this will occur at one-quarter of the complete cycle and at this time the proportional band module 68' comes into effect to control the rate of increase in pressure by controlling the point at which a maximum pressure signal is discharged from module 66'. In other words, module 68' proportions the increase of pressure from the port 60 of the pilot relay by controlling the relative distance between the nozzle 74' and the flapper 61' as the flapper is being continually moved by the increasing change in the signal from the transducer unit 10.

The maximum speed is reached at three-eighths of the complete cycle and once this is reached, the lower ball valve 176 of module 66' remains open with the top ball valve 188 remaining closed. Maximum speed of the bobbin continues so long as this condition occurs. at the point on the cycle of operation where the retard module 84" and the retard relay come into effect, namely, at three-quarters of the complete cycle, the pressure issuing from the retard relay 84' in the line 82 is reduced thus reducing the pressure on the diaphragm 186 in module 66' to permit a change in the position of the valves 176 and 188 and a controlled bleed-off of pressure to atmosphere through the port 192. This will reduce the pressure signal emitting from the port R of the module 66' to now reduce the speed of the bobbin from the three-quarter cycle point until the end of the cycle.

It will be obvious by changing cards to provide different cuts therein a different program can be set up instantly in the apparatus. For example, if no slot was provided in the card C for the retard module 84", the speed of the bobbin on reaching a maximum speed would remain at this speed until the full cycle is completed.

The programming and control system of the present invention heretofore described and illustrated in the drawings fully and effectively accomplishes the objects and advantages of the present invention. It will be realized, however, that the foregoing specific embodiments have been shown and described only for the purpose of illustrating the principles of this invention and are subject to some changes without departing from such principles or from the spirit of the invention.

What is claimed is:

1. A fluid pressure operated system for programming a parameter of desired functions into an operation to effect the condition of the operation in accordance with the parameter programmed comprising:
   (A) a source of supply pressure;
   (B) transducer means for sensing a state of the operation being performed, said transducer means including,
      (1) pressure responsive means continuously supplying a pressure signal at a magnitude indicative of the state of operation being performed;
   (C) a programming and controlling apparatus connected to said source of supply pressure and to said transducer means, said programming and controlling apparatus emitting an output pressure control signal at a magnitude normally proportional to the magnitude of the presure signal from said transducer means but modified in accordance with the parameter of functions programmed, said programming and controlling apparatus including at least
      (1) means for causing the magnitude of the pressure control signal to be normally proportional to the magnitude of the pressure signal from said transducer means subject to the parameter of functions programmed;
      (2) starting magnitude control means for emitting a pressure signal to control the magnitude of the condition of the operation at the start of the operation, said starting magnitude control means including adjustable means for varying the magnitude of its pressure signal which pressure signal of said starting magnitude control means normally effects the output control signal from the apparatus before selector means causes the output control signal to be effected proportionally by the transducer pressure signal;
      (3) maximum magnitude control means for emitting a pressure signal to control the limit of the output signal of the apparatus and determine the maximum magnitude of the condition of the operation, said maximum magnitude control means including adjustable means for varying its pressure signal to effect the maximum magnitude of the output signal of the apparatus;
      (4) rate of magnitude increase control means for emitting a pressure signal and controlling the rate of increase of the magnitude of the condition of the operation from the start of the operation until the condition of the operation reaches its maximum magnitude, said rate of magnitude increase control means including adjustable means for controlling when the maximum magnitude of the condition of the operation is reached in the operation, and
      (5) rate of magnitude decrease control means for emitting a pressure signal to control the rate of decrease of the magnitude of the condition of the operation from the maximum magnitude of the condition of the operation, said rate of magnitude decrease control means including adjustable means for varying when the maximum magnitude of the condition of the operation is decreased during the operation.

2. A fluid pressure operated system as claimed in claim 1 in which said means for causing the output pressure control signal of the apparatus to be normally proportional to the signal from said transducer means includes:
   (A) a pilot relay valve means having
      (1) an inlet port connected to said source of supply pressure,
      (2) a pilot chamber,
      (3) means connecting said pilot chamber to said inlet port, (4) an outlet port for emitting a pressure signal, and
(5) means connecting said inlet port to said outlet port and responsive to pressure variations in said pilot chamber for emitting the pressure signal from said outlet port; and
(B) a flapper-valve assembly including:
(1) a nozzle and a flapper movable relative to one another, said nozzle being operatively connected to said pilot chamber, and
(C) means normally responsive to variations of said transducer pressure signal for moving said flapper and said nozzle relative to one another such that pressure in said pilot chamber is a function of said relative movement of said flapper and said nozzle.

3. A fluid pressure operated system as claimed in claim 2 in which an increase of said transducer pressure signal causes said means responsive thereto to move said flapper and said nozzle to decrease spacing therebetween and provide a feedback pressure to said pilot chamber for operating said pressure responsive means in said pilot relay valve means to increase the pressure signal from the outlet port thereof; and in which said rate of magnitude increase control means includes a proportional band means having an inlet port connected to the outlet port of said pilot relay valve means and an outlet port, means connected to said outlet port of said proportional band means for biasing said flapper and said nozzle away from each other to thereby oppose said means for moving said flapper and said nozzle toward each other, said rate of magnitude increase control means providing a proportional band.

4. A fluid pressure operated system as claimed in claim 3 in which said maximum magnitude control means includes a pressure responsive position switch means having an inlet port connected to the outlet port of said pilot relay valve means and an outlet port for emitting its pressure signal, and in which said rate of magnitude decrease control means includes a relay valve means having an inlet port connected to the outlet port of said maximum magnitude control means and an outlet port defining an outlet for emitting the output pressure control signal of said programming and controlling apparatus, said relay valve means including pressure responsive biasing means for controlling the flow of pressure between its inlet port and outlet port, said pressure responsive biasing means being normally operable by the pressure signal from said transducer means.

5. A fluid pressure operated system as claimed in claim 4 in which said starting magnitude control means is a position switch means having an inlet port connected directly to said source of supply pressure and an outlet port for emitting a pressure signal therefrom at a predetermined pressure as determined by its adjustable means, said pressure signal from said starting magnitude control means controlling the output control pressure signal from said programming and controlling apparatus until the pressure signal emitted from said transducer means is greater.

6. A fluid pressure operated system as claimed in claim 5 in which said selector means is shuttle valve means, said shuttle valve means being operatively connected to the outlet port of said starting magnitude control means and to said transducer means whereby the respective pressure signals of said transducer means and said starting magnitude control means oppose one another, said shuttle valve having an outlet port operatively connected to said means for moving said flapper and said nozzle towards one another and to the pressure responsive biasing means of said rate of magnitude decrease control means for controlling the output pressure control signal.

7. A fluid pressure operated system as claimed in claim 5 in which said selector means is a shuttle valve, said shuttle valve being operatively connected to the outlet port of said starting magnitude control means and to the outlet port of said rate of magnitude decrease control means whereby the respective signals of said starting magnitude control means and said rate of magnitude decrease control means oppose one another, said shuttle valve having an outlet port for emitting the output pressure control signal of said programming and controlling apparatus.

8. A fluid pressure operated system as claimed in claim 1 in which each of said adjustable means for said starting magnitude control means, said maximum magnitude control means, said rate of magnitude increase control means and said rate of magnitude decrease control means is individually manually operable.

9. A fluid pressure operated system as claimed in claim 1 in which each of said adjustable means for said starting magnitude control means, said maximum magnitude control means, said rate of magnitude increase control means and said rate of magnitude decrease control means is simultaneously adjustable.

10. A fluid pressure operated system as claimed in claim 1 in which each of said adjustable means for said starting magnitude control means, said maximum magnitude control means, said rate of magnitude increase control means and said rate of magnitude decrease control means includes a movable plunger, and in which means is provided for simultaneously moving each plunger to control the respective functions of said starting magnitude control means, said maximum magnitude control means, said rate of magnitude increase control means and said rate of magnitude decrease control means.

11. A fluid pressure operated system as claimed in claim 10 in which said means for simultaneously moving each plunger includes a card having a contour for engaging each plunger to move same a predetermined amount.

12. A fluid pressure operated system as claimed in claim 11 in which said contour for engaging and moving each plunger is a cutout portion in each card.

13. A fluid pressure operated system as claimed in claim 11 including:
(A) a pilot relay valve means having
(1) an inlet port connected to said source of supply pressure,
(2) a pilot chamber,
(3) means connecting said pilot chamber to said inlet port,
(4) an outlet port for emitting a pressure signal, and
(5) means connecting said inlet port to said outlet port and responsive to pressure variations in said pilot chamber for emitting the pressure signal from said outlet port; and
(B) a flapper-valve assembly including:
(1) a nozzle and a flapper movable relative to one another, said nozzle being operatively connected to said pilot chamber, and
(2) reset means for selectively positioning said nozzle relative to said flapper to define a condition of the parameter at the start of the operation, and
(C) means normally responsive to variations of said transducer pressure signal for moving said flapper and said nozzle relative to one another such that pressure in said pilot chamber is a function of said relative movement of said flapper and said nozzle.

14. A fluid pressure operated system as claimed in claim 13 in which said reset means includes a movable plunger and in which said card also includes a contour to engage and move the plunger of said reset means simultaneously with the setting of the plunger of said starting magnitude control means, said maximum magnitude control means, said rate of magnitude increase control means and said rate of magnitude decrease control means.

15. A fluid pressure operated system as claimed in claim 13 in which reset means is manually adjustable.

16. A fluid pressure operated system for programming a parameter of desired functions into an operation to effect the condition of the operation in accordance with the parameter programmed comprising:
(A) a source of supply pressure;
(B) transducer means for sensing a state of the operation being performed, said transducer means including,
  (1) pressure responsive means continuously supplying a pressure signal at a magnitude indicative of the state of operation being performed;
(C) a programming and controlling apparatus for emitting an output pressure control signal at a magnitude normally proportional to the magnitude of the pressure signal from said transducer means but modified in accordance with the parameter of functions programmed, said programming and controlling apparatus including at least
  (1) pilot operated relay means having a supply port connected to said source of supply pressure and an outlet port for normally issuing a pressure signal of a magnitude proportional to the magnitude of the pressure signal from said transducer means; said pilot operated relay means further including,
    (a) a pilot chamber communicating with the source of supply pressure, and
    (b) pressure responsive means subject to variations of pressure in said pilot chamber for controlling the emission of the pressure signal from the pilot operated relay means;
  (2) a flapper-valve assembly including
    (a) a nozzle operatively connected to said pilot chamber,
    (b) a flapper movable relative to said nozzle to vary feedback pressure to the pilot chamber of said pilot operated relay means;
  (3) opposed pressure responsive means for moving said flapper and said nozzle towards and away from each other, said last-mentioned means including
    (a) a first means normally responsive to the transducer pressure signal for reducing the space between the nozzle and flapper, and
    (b) a second means responsive to the pilot operated relay means pressure signal for increasing the space between the nozzle and flapper;
  (4) proportional band adjustment means for selecting the amount the second means of said opposed pressure responsive means increases the space between the nozzle and the flapper for a given increase in the pressure signal from said pilot relay means to thereby provide selection of the rate of change of the condition of the operation;
  (5) set point means for issuing a pressure signal to define the state of operation at which an increase in the magnitude of the condition of the operation will be first effected, and means associated with said set point means for causing said set point means to be ineffective when the magnitude of the transducer pressure signal is greater than the magnitude of the set point means signal;
  (6) a position switch means having a supply port operatively connected to the outlet port of said pilot relay means and an outlet port for delivering a pressure signal of selected magnitude relative to the magnitude of the signal from said pilot relay means, said position switch means having means for limiting the maximum magnitude of its pressure signal for defining the maximum magnitude of the condition of the operation; and
  (7) a retard relay means having a supply port for receiving the pressure signal from said position switch means and an output port for delivering a signal which normally defines the output pressure control signal of the programming and controlling apparatus, said retard relay means being normally responsive to the transducer pressure signal and including means for selectively defining the stage of the operation at which the magnitude of the condition of the operation will begin to reduce.

17. A fluid pressure operated system as claimed in claim 16 including reset means for selectively positioning said nozzle relative to said flapper to define a condition of the parameter at the start of the operation.

18. A fluid pressure operated system as claimed in claim 16 in which said set point means includes a position switch means having a supply port connected to said source of supply and an outlet port for issuing a pressure signal at a constant value, said position switch means including adjustment means for determining the magnitude of the signal issued therefrom.

19. A fluid pressure operated system as claimed in claim 18 in which said means associated with said set point means is a shuttle valve having a first inlet port operatively connected to outlet port of the position switch means of said set point means and a second inlet port operatively connected to said transducer means for receiving the transducer pressure signal, said shuttle valve having an outlet port operatively connected to said retard relay means and to the first means of said opposed pressure responsive means whereby the pressure signal issued said retard relay is a function of the pressure signal issued from said set point means when the same is greater than the transducer pressure signal and vice versa.

20. A fluid pressure operated system as claimed in claim 18 in which said means associated with said set point means is a shuttle valve means having a first inlet port operatively connected to the outlet port of the position switch means of said set point means and a second inlet port connected to the outlet port of said retard relay means, said shuttle valve means having an outlet port for issuing a pressure signal equal to the pressure which is a function of the pressure signal issued by set point means when the same is greater than the pressure signal issued by said retard relay and vice versa to thereby define the output pressure control signal.

21. An apparatus for programming and controlling a parameter of desired functions into an operation by emitting an output pressure control signal at a magnitude normally proportional to the magnitude of a pressure signal indicative of a state of the operation being performed but modified in accordance with the parameter of desired functions, said programming and controlling apparatus comprising:
(A) means for causing the magnitude of the pressure control signal to be normally proportional to the magnitude of the pressure signal indicative of the state of operation subject to the parameter of functions programmed;
(B) a first pressure control module for emitting a pressure signal to control the minimum magnitude of the condition of the operation at any stage of the operation, said first module including
  (1) a plunger movable to adjust the pressure signal of the module so as to vary the minimum magnitude of the condition of the operation to a predetermined amount;
(C) a second pressure control module for emitting a pressure signal to control the limit of the output signal of the apparatus and determine the maximum magnitude of the condition of the operation, said second pressure control module including
  (1) a plunger movable to adjust its pressure signal to a predetermined amount as modified by said means;

(D) a third pressure control module for emitting a pressure signal to control the point when the magnitude of the condition of the operation begins to increase from the pressure signal of said first module toward the maximum magnitude of the condition of the operation as controlled by said second module, said third module including
    (1) a movable plunger for predetermining its pressure signal;
(E) a fourth pressure control module for emitting a pressure signal and controlling the rate of increase of the magnitude of the condition of the operation from the start of operation until the condition of the operation reaches its maximum magnitude, said fourth pressure control module including
    (1) a movable plunger adjustable to control its pressure signal to a predetermined amount modified by said means;
(F) a fifth pressure control module for emitting a pressure signal to control the point of and rate of decrease from the maximum magnitude of the condition of the operation, said fifth pressure control module including
    (1) a movable plunger to adjustably vary when the condition of the operation is decreased from its maximum magnitude during the operation, and
(G) means for operatively engaging each of the plungers of said modules for simultaneously setting up the program for the apparatus.

22. An apparatus as claimed in claim 21 in which said first to fifth modules are arranged in side by side relationship with their plungers pointing in the same direction and in which said means for operatively engaging each of said plungers for simultaneously setting up the program for the apparatus includes a precut card having cutout portions for operatively engaging each of said plungers and moving the same a predetermined distance.

23. An apparatus as claimed in claim 22 including a plurality of pivotal levers respectively engaging each of said plungers, said card engaging said levers to pivot the same a predetermined arc.

24. An apparatus as claimed in claim 23 in which said means for causing the output pressure control signal of the apparatus to be normally proportional to the signal from the transducer means includes:
(A) a pilot relay valve means having
    (1) an inlet port connected to a source of supply pressure,
    (2) a pilot chamber,
    (3) means connecting said pilot chamber to said inlet port,
    (4) an outlet port for emitting a pressure signal, and
    (5) means connecting said inlet port to said outlet port and responsive to pressure variations in said outlet port; and
(B) a flapper valve assembly including:
    (1) a nozzle and a flapper movable relative to one another, said nozzle being operatively connected to said pilot chamber, and
(C) bellows means responsive to variations of the pressure signal indicative of the state of operation for moving the flapper towards said nozzle, and
(D) a second bellows means responsive to the pressure signals emitted from said third and fourth module for initially positioning said nozzle relative to said flapper.

References Cited

UNITED STATES PATENTS

| | | | |
|---|---|---|---|
| 2,915,079 | 12/1959 | Harrison | 137—85 XR |
| 3,015,204 | 1/1962 | Long | 57—98 |
| 3,338,519 | 8/1967 | Kreuter et al. | 137—86 XR |

ROBERT G. NILSON, Primary Examiner

U.S. Cl. X.R.

57—95